United States Patent [19]
Kanekura

[11] Patent Number: 5,636,221
[45] Date of Patent: Jun. 3, 1997

[54] DATA PACKET SWITCHING APPARATUS USING ASYNCHRONOUS CONTROL

[75] Inventor: Hiroshi Kanekura, Nara-ken, Japan

[73] Assignee: Sharp Kabushiki Kaisha, Osaka-fu, Japan

[21] Appl. No.: 427,736

[22] Filed: Apr. 24, 1995

Related U.S. Application Data

[63] Continuation of Ser. No. 12,362, Feb. 2, 1993, abandoned.

[30] Foreign Application Priority Data

Feb. 4, 1992 [JP] Japan ..................... 4-018781

[51] Int. Cl.$^6$ ..................... H04L 12/56; H04J 3/26
[52] U.S. Cl. ..................... 370/388; 370/94.1; 370/389
[58] Field of Search ..................... 370/94.1, 85.2, 370/85.6, 60, 58.1, 85.1; 340/825.5; 395/250

[56] References Cited

U.S. PATENT DOCUMENTS

| | | | |
|---|---|---|---|
| 4,769,813 | 9/1988 | Lenart | 370/60 |
| 4,837,761 | 6/1989 | Isono et al. | 370/60 |
| 4,862,454 | 8/1989 | Dias et al. | 370/60 |
| 4,918,686 | 4/1990 | Hayashi et al. | 370/60 |
| 4,985,890 | 1/1991 | Matsumoto et al. | |
| 5,008,880 | 4/1991 | Azuma | 370/85.6 |
| 5,133,054 | 7/1992 | Matsumoto et al. | 395/250 |

OTHER PUBLICATIONS

An Implementation Method of a Large-Scale Storage Machanism for the Date-Driven Processor, Nov. 22, 1989.

*Primary Examiner*—Douglas W. Olms
*Assistant Examiner*—Chau T. Nguyen

[57] ABSTRACT

A data transmission apparatus includes a branching mechanism provided corresponding to an A port, a branching mechanism provided corresponding to a B port, a junction mechanism provided corresponding to a C port and a junction mechanism provided corresponding to a D port. One branching mechanism applies packet data to a one of the junction mechanisms according to an identifier. The other branching mechanism applies packet data to one of the junction mechanisms according to an identifier.

4 Claims, 7 Drawing Sheets

| DESTINATION FIELD | INSTRUCTION FIELD | DATA 1 FIELD | DATA 2 FIELD |

DATA PACKET SWITCHING APPARATUS USING ASYNCHRONOUS CONTROL

This application is a continuation, of application Ser. No. 08/012,362 filed on Feb. 2, 1993, now abandoned.

CROSS-REFERENCE TO RELATED APPLICATION

This application is related to applications Ser. No. 259,850, filed Oct. 19, 1988, now U.S. Pat. No. 5,133,054, Ser. No. 260,068, filed Oct. 20, 1988, now U.S. Pat. No. 4,985,890, Ser. No. 323,021, filed Mar. 14, 1989, now U.S. Pat. No. 5,008,880, Ser. No. 497,221, filed Mar. 22, 1990, and Ser. No. 800,465, filed Nov. 29, 1991, commonly assigned with the present invention.

BACKGROUND OF THE INVENTION

1. Field of the Invention

The present invention relates generally to data transmission apparatuses, and more particularly, to a data junction and branching mechanism for an asynchronous data transmission path.

2. Description of the Background Art

Data processing apparatuses such as data flow type information processors employ asynchronous data transmission paths. In such a data processing apparatus, a junction mechanism for merging a plurality of packet data is used for transmitting packet data applied from data transmission paths in a plurality of preceding stages to a data transmission path in one succeeding stage. For transmitting packet data applied from a data transmission path in a preceding stage to data transmission paths in a plurality of succeeding stages, a branching mechanism for sequentially branching the respective packet data is used. A junction and branching mechanism including a junction mechanism and a branching mechanism is used for transmitting each of a plurality of packet data applied from data transmission paths in the plurality of preceding stages to any of data transmission paths in the plurality of succeeding stages.

Figure 7:
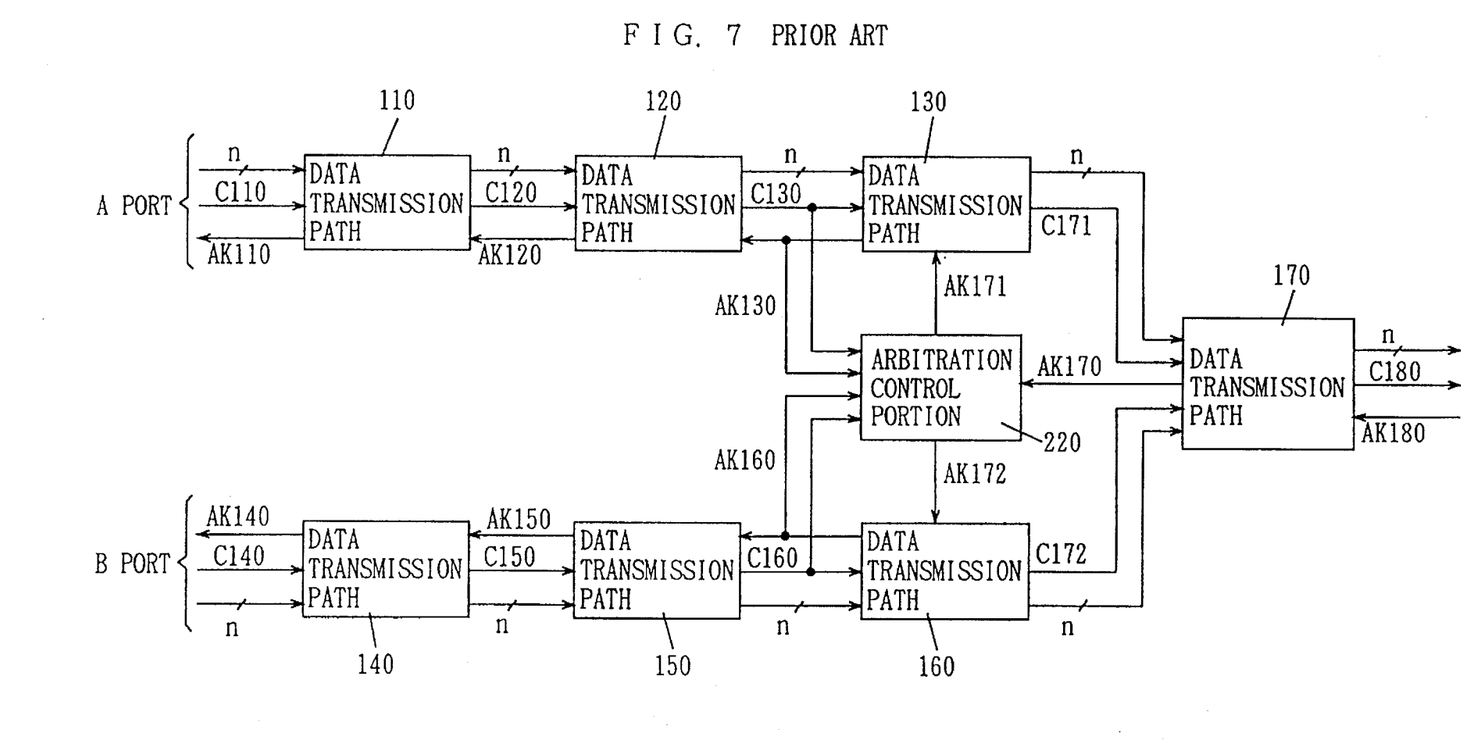
FIG. 7 is a block diagram showing the structure of a conventional data transmission apparatus implementing a junction mechanism.

FIG. 7 is a block diagram showing a conventional data transmission apparatus for merging a plurality of packet data applied from transmission paths in two preceding stages to a transmission path in one succeeding stage. Such a data transmission apparatus is disclosed in Japanese Patent Laying-Open No. 62-265738 corresponding to U.S. patent application Ser. No. 260,068, now issued as U.S. Pat. No. 4,985,890.

An n-bit packet data applied from an A port is transferred to a data transmission path 170 through data transmission paths 110, 120 and 130. An n-bit packet data applied to a B port is transferred to data transmission path 170 through data transmission paths 140, 150 and 160. When the packet data from the A port and the B port arrive at the transmission paths 130 and 160 nearly simultaneously, the one packet data having arrived prior to the other is first transferred to data transmission path by the control of an arbitration control portion 220.

Operation will be described in a case where packet data from the A port arrives prior to packet data from the B port.

Packet data is applied to data transmission path 110 in response to a transmission signal C110. As a result, a transmission acknowledging signal AK110 enters the inhibiting state. When a transmission acknowledging signal AK120 is in the permitting state, the packet data is transferred to data transmission path 120 in response to a transmission signal C120. As a result, the transmission acknowledging signal AK120 enters the inhibiting state. When a transmission acknowledging signal AK130 is in the permitting state, the packet data is transferred to data transmission path 130 in response to a data transmission signal C130. As a result, the transmission acknowledging signal AK130 enters the inhibiting state.

Arbitration control portion 220 sets a transmission acknowledging signal AK171 to the permitting state and a transmission acknowledging signal AK172 to the inhibiting state in response to the transmission signal C130 and the transmission acknowledging signal AK130 when a transmission acknowledging signal AK170 is in the permitting state.

Meanwhile, packet data is applied to data transmission path 140 in response to a transmission signal C140. As a result, a transmission acknowledging signal AK140 enters the inhibiting state. When a transmission acknowledging signal AK150 is in the permitting state, the packet data is transferred to data transmission path 150 in response to a transmission signal C150. As a result, the transmission acknowledging signal AK150 enters the inhibiting state. When a transmission acknowledging signal AK160 is in the permitting state, the packet data is transferred to data transmission path 160 in response to a transmission signal C160. As a result, the transmission acknowledging signal AK160 enters the inhibiting state.

With the transmission acknowledging signal AK171 being in the permitting state and the transmission acknowledging signal AK172 being in the inhibiting state, data transfer from data transmission path 130 to data transmission path 170 is permitted and data transfer from data transmission path 160 to data transmission path 170 is caused to stand by. After the packet data is transferred from data transmission path 130 to data transmission path 170 response to a transmission signal C171, the transmission acknowledging signal AK172 enters the permitting state to transfer the packet data from data transmission path 160 to data transmission path 170.

Figure 8:
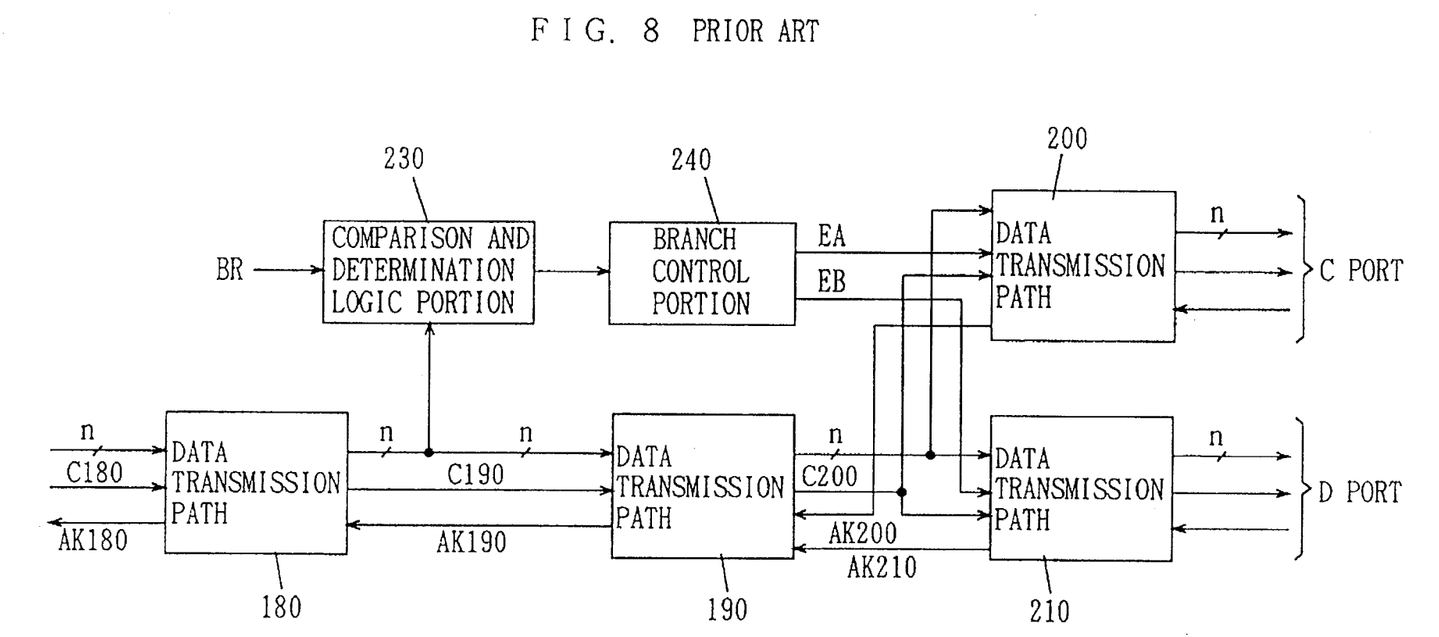
FIG. 8 is a block diagram showing the structure of a conventional data transmission apparatus implementing a branching mechanism.

FIG. 8 is a block diagram showing a conventional data transmission apparatus in which packet data applied from a transmission path in one preceding stage is branched out into transmission paths in two succeeding stages in turn. This data transmission apparatus is disclosed in Japanese Patent Laying-Open No-62-265740 corresponding to U.S. patent application Ser. No. 259,850, now issued as U.S. Pat. No. 5,133,054.

Packet data applied to a data transmission path 180 is transferred to either a data transmission path 200 or 210 through a data transmission path 190 and output to a C port or a D port.

Packet data is applied to data transmission path 180 in response to a transmission signal C180. As a result, a transmission acknowledging signal AK180 enters the inhibiting state. When a transmission acknowledging signal AK190 is in the permitting state, the packet data is transferred to data transmission path 190 in response to a transmission signal C190. As a result, the transmission acknowledging signal AK190 enters the inhibiting state.

Meanwhile, a branch destination specifying bit BR previously applied to a comparison and determination portion 230. Each packet data includes an identifier. Comparison and determination logic portion 230 compare an identifier included in packet data with the branch destination specifying bit BR and applies the comparison result to a branch control portion 240. Branch control portion 240 activates either of activation signals EA or EB according to the comparison result.

Firstly, it is assumed, for example, that the activation signal EA is activated. In this case, when a transmission acknowledging signal AK200 is in the permitting state, packet data is transferred from data transmission path 190 to data transmission path 200 in response to a transmission signal C200. Conversely, it is assumed that the activation signal EB is activated. In this case, when a transmission acknowledging signal AK210 is in the permitting state, packet data is transferred from data transmission path 190 to data transmission path 210 in response to the transmission signal C200.

A junction and branching mechanism is structured by connecting the data transmission apparatus shown in FIG. 8 to the succeeding stage of the data transmission apparatus shown in FIG. 7.

The total performance of the junction and branching mechanism with the data transmission apparatuses shown in FIGS. 7 and 8 connected in series is limited by maximum flew rate of packet data merged in transmission path 170. Mere specifically, the performance of packet data input is allowed only up to the maximum flow rate of data transmission paths 170, 180 and 190 through which the merged packet data flow.

When packet data are to be simultaneously input to a plurality of data transmission paths on the input side, packet data can not be input to each data transmission path at the maximum flow rate of its data transmission path. As a result, a flow rate of input packet data is inevitably reduced. In a case of merging of packet data from n ports, for example, a flow rate of packet data which can be input to each pore is reduced to 1/n. In this case, a buffer should be provided.

SUMMARY OF THE INVENTION

An object of the present invention is to hold down the reduction of a data flow raze to the minimum in a data transmission apparatus for transmitting a plurality of pieces of data applied from a plurality of preceding stage portions to any of a plurality of succeeding stage portions.

Another object of the present invention is to improve efficiency of data junction and branching in an asynchronous data transmission path.

A further object of the present invention is to implement a high-speed junction and branching function in an asynchronous data transmission path.

The data transmission apparatus according to the present invention, wherein a plurality of data applied from a plurality of preceding stage portions are transmitted to any of a plurality of succeeding stage portions, includes a plurality of branching mechanisms provided corresponding to the plurality of preceding stage portions and a plurality of junction mechanisms provided corresponding to the plurality of succeeding stage portions. Each data includes an identifier for specifying a succeeding stage portion to which the data is to be transmitted.

Each of the plurality of branching mechanisms receives data from its corresponding preceding stage portion and transmits the data to any of the plurality of junction mechanisms according to an identifier included in the data. Each of the plurality of the junction mechanisms sequentially transmits the data applied from the plurality of branching mechanisms to the corresponding succeeding stage portion.

According to the data transmission apparatus, when the plurality of data applied from the plurality of preceding stage portions specify destinations different from each other, the data of the plurality of preceding stage portion are simultaneously transmitted to the plurality of succeeding stage portion through the corresponding branching mechanisms and different junction mechanism, respectively. As a result, a reduction of the data flow rate can be held down to the minimum. Therefore, the efficiency of data junction and branching is improved to realize a high-speed junction and branching mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings which are given by way of illustration only and thus are not limitative of the present invention and wherein.

DESCRIPTION OF THE PREFERRED EMBODIMENTS

Embodiments of the present invention will be described in detail with reference to the drawings in the following.

Figure 1:
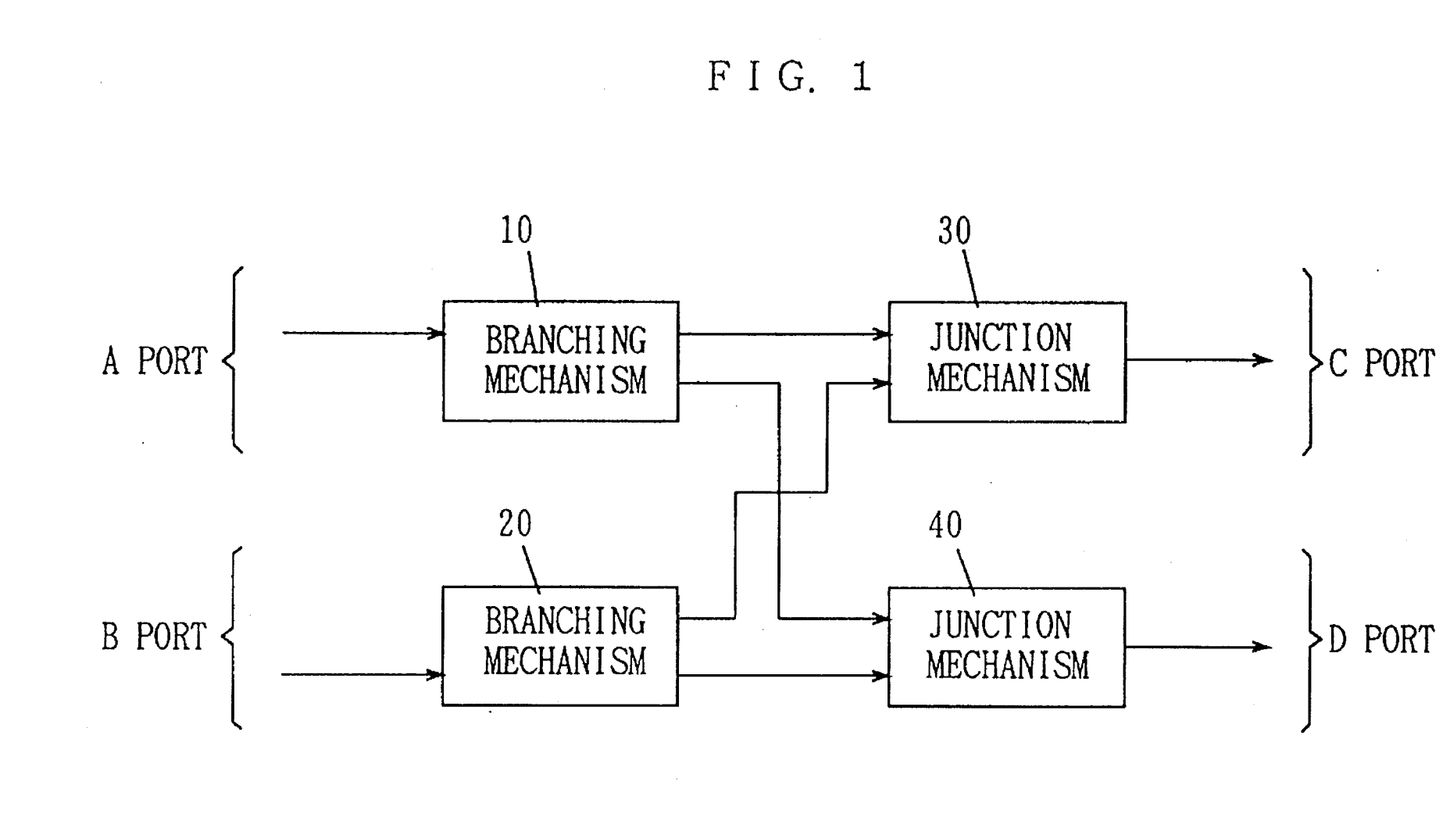
FIG. 1 is a block diagram showing the structure of a data transmission apparatus according to one embodiment of the present invention.

FIG. 1 is a block diagram showing the structure of a data transmission apparatus according to one embodiment of the present invention. The data transmission apparatus includes a branching mechanism 10 corresponding to an A port, a branching mechanism 20 corresponding to a B port, a junction mechanism 30 corresponding to a C port and a junction mechanism 40 corresponding to a D port.

The structure and operation of branching mechanisms 10 and 20 are the same as those of the data transmission apparatus shown in FIG. 8. The structure and the operation of the data transmission apparatus shown in FIG. 8 are disclosed in Japanese Patent Laying-Open No. 62-265740 and its corresponding U.S. patent application Ser. No. 259, 850 (U.S. Pat. No. 5,133,054). The structure and the operation of junction mechanisms 30 and 40 are the same as those of the data transmission apparatus shown in FIG. 7 which is disclosed in Japanese Patent Laying-Open No. 62-265738 and its corresponding U.S. patent application Ser. No. 260, 068, now U.S. Pat No. 4,985,890.

Branching mechanism 10 receives packet data of the A port and transfers the packet data to one of junction mechanisms 30 and 40 according to an identifier included in the packet data. Branching mechanism 20 receives packet data of the B port and transfers the packet data to one of junction mechanisms 30 and 40 according to an identifier included in the packet data. The branching mechanisms 10, 20 deliver packet data to the junction mechanisms 30, 40 through a direct, connection. Junction mechanism 30 outputs the packet data applied from branching mechanisms 10 and 20 to the C port in the order of arrival. Junction mechanism 40 outputs the packet data applied from branching mechanisms 10 and 20 to the D port in the order of arrival.

Figure 2:
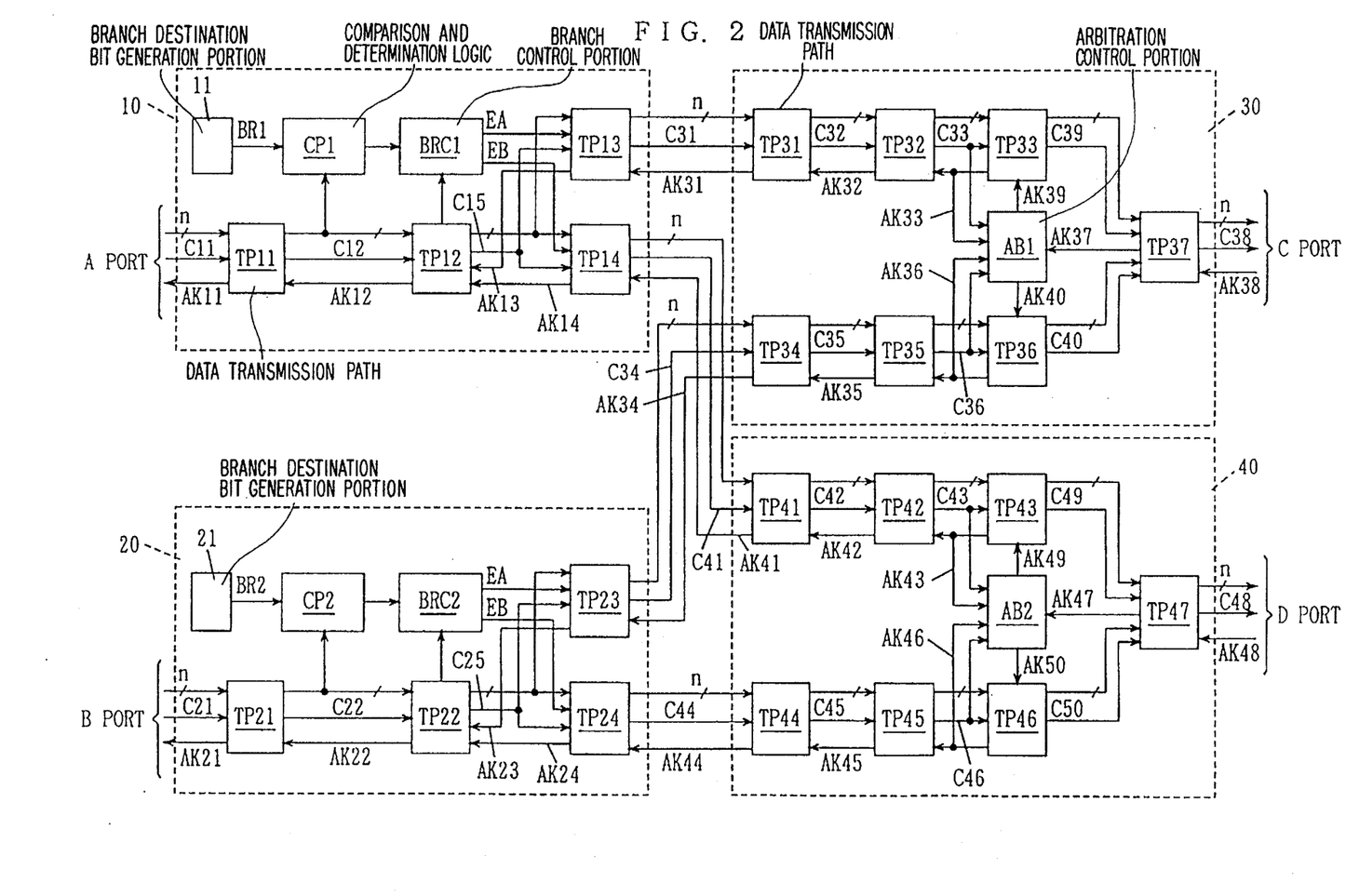
FIG. 2 is a block diagram showing the structure of the data transmission apparatus of FIG. 1 in detail.

FIG. 2 is a block diagram showing the detailed structure of the data transmission apparatus of FIG. 1.

Branching mechanism 10 includes data transmission paths TP11, TP12, TP13 and TP14, a branch destination specifying bit generating portion 11, a comparison and determination logic portion CP1 and a branch control portion BRC1. Data transmission paths TP11, TP12, TP13 and TP14 correspond to data transmission paths 180, 190, 200 and 210 shown in FIG. 8; respectively. Comparison and determination logic portion CP1 corresponds to comparison and determination logic portion 230 of FIG. 8 and branch control portion BRC1 corresponds to branch control portion 240 shown in FIG. 8.

Transmission signals C11, C12 and C15 correspond to the transmission signals C180, C190 and C200 shown in FIG. 8, respectively. Transmission acknowledging signals AK11, AK12, AK13 and AK14 correspond to the transmission acknowledging signals AK180, AK190, AK200 and AK210 shown in FIG. 8, respectively. A branch destination specifying bit BR1 corresponds to the branch destination specifying bit BR of FIG. 8 and activation signals EA and EB to the activation signals EA and EB shown in FIG. 8.

Branching mechanism 20 includes data transmission paths TP21, TP22, TP23 and TP24, a branch destination specifying bit generating portion 21, a comparison and determination logic portion CP2 and a branch control portion BRC2. Data transmission paths TP21, TP22, TP23 and TP24 correspond to data transmission paths 180, 190, 200 and 210 shown in FIG. 8, respectively. Comparison and determination logic portion CP2 corresponds to comparison and determination logic portion 230 shown in FIG. 8 and branch control portion BRC2 to branch control portion 240 of FIG. 8.

Transmission signals C21, C22 and C25 correspond to the transmission signals C180, C190 and C200 shown in FIG. 8, respectively. Transmission acknowledging signals AK21, AK22, AK23 and AK24 correspond to the transmission acknowledging signals AK180, AK190, AK200 and AK210 shown in FIG. 8, respectively. A branch destination specifying bit BR2 corresponds to the branch destination specifying bit BR shown in FIG. 8 and activation signals EA and EB correspond to the activation signals EA and EB shown in FIG. 8.

Junction mechanism 30 includes data transmission paths TP31, TP32, TP33, TP34, TP35, TP36 and TP37 and an arbitration control portion AB1. Data transmission paths TP31, TP32, TP33, TP34, TP35, TP36 and TP37 correspond to data transmission paths 110, 120, 130, 140, 150, 160 and 170 shown in FIG. 7, respectively, and arbitration control portion AB1 corresponds to arbitration control portion 220 shown in FIG. 7.

Transmission signals C31, C32, C33, C34, C35, C36, C39, C40 and C38 correspond to transmission signals C110, C120, C130, C140, C150, C160, C171, C172 and C180 shown in FIG. 7, respectively. Transmission acknowledging signals AK31, AK32, AK33, AK34, AK35, AK36, AK37, AK38, AK39 and AK40 correspond to the transmission acknowledging signals AK110, AK120, AK130, AK140, AK150, AK160, AK170, AK180, AK171 and AK172 shown in FIG. 7, respectively.

Junction mechanism 40 includes data transmission paths TP41, TP42, TP43, TP44, TP45, TP46 and TP47 and an arbitration control portion AB2. Data transmission paths TP41, TP42, TP43, TP44, TP45, TP46 and TP47 correspond to data transmission paths 110, 120, 130, 140, 150, 160 and 170 of FIG. 7, respectively, and an arbitration control portion AB2 corresponds to arbitration control portion 220 shown in FIG. 7.

Transmission signals C41, C42, C43, C44, C45, C46, C49, C50 and C48 correspond to the transmission signals C110, C120, C130, C140, C150, C160, C171, C172 and C180 shown in FIG. 7, respectively. Transmission acknowledging signals AK41, AK42, AK43, AK44, AK45, AK46, AK47, AK48, AK49 and AK50 correspond to transmission acknowledging signals AK110, AK120, AK130, AK140, AK150, AK160, AK170, AK180, AK171 and AK172 shown in FIG. 7, respectively.

Packet data output from data transmission path TP13 in branching mechanism 10 is applied to data transmission path TP31 in junction mechanism 30. The transmission signal C31 is applied from data transmission path TP13 to data transmission path TP31 and the transmission acknowledging signal AK31 is applied from data transmission path TP31 to data transmission path TP13. Packet data output from data transmission path TP14 in branching mechanism 10 is applied to data transmission path TP41 in junction mechanism 40. The transmission signal C41 is applied from data transmission path to data transmission path TP41 and the transmission acknowledging signal AK41 is applied from data transmission path TP41 to data transmission path TP14.

Packet data output from data transmission path TP23 in branching mechanism 20 is applied to data transmission path TP34 in junction mechanism 30. The transmission signal C34 is applied from data transmission path TP23 to data transmission path TP34 and the transmission acknowledging signal AK34 is applied from data transmission path TP34 to data transmission path TP23. Packet data output from data transmission path TP24 in branching mechanism 20 is applied to data transmission path TP44 in junction mechanism 40. The transmission signal C44 is applied from data transmission path TP24 to data transmission path TP44 and the transmission acknowledging signal AK44 is applied from data transmission path TP44 to data transmission path TP24.

Figure 3:
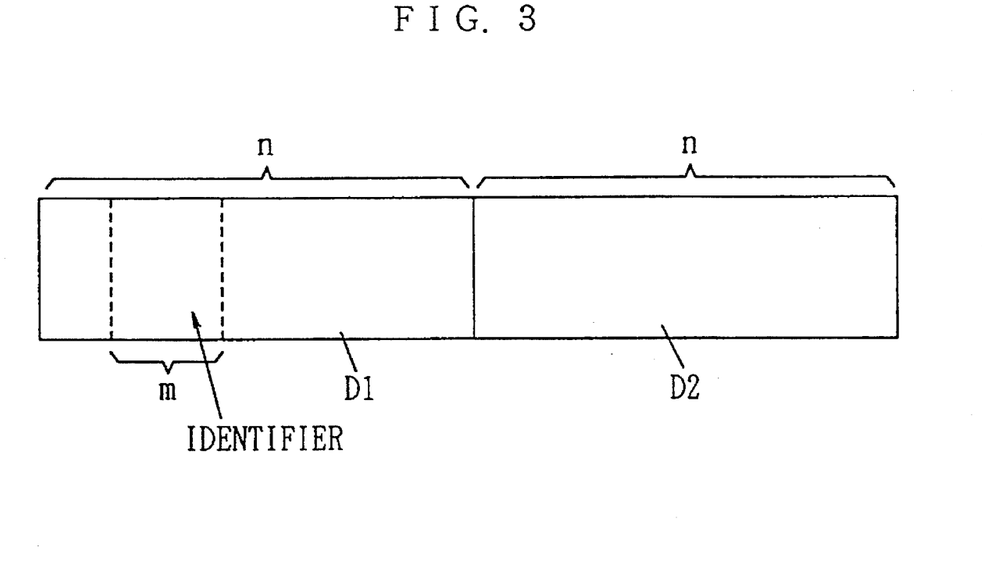
FIG. 3 is a diagram showing an arrangement of packet data to be transmitted in the embodiment.

FIG. 3 shows an arrangement of packet data to be transmitted in the data transmission apparatus.

As shown in FIG. 3, packet data includes a first word D1 of n bits and a second word D2 of n bits. The first word D1 includes an identifier or of m bits. The identifier indicates a branch destination of the packet data. The first word D1 and the second word D2 are successively or simultaneously transmitted.

Operation of the data transmission apparatus of FIG. 2 will be described in the following four cases (1)–(4).

(1) In a case where both packet data from the A port and the B port are output to the C port:

The packet data from the A port is transferred to data transmission path TP33 through data transmission paths TP11, TP12, TP13, TP31 and TP32. The packet data from the B port is transferred to data transmission path TP36 through data transmission paths TP21, TP22, TP23, TP34 and TP35.

When the packet data from the A port arrives prior to the packet data from the B port, the transmission acknowledging signal AK39 is set to the permitting state and the transmission acknowledging signal AK40 is set to the inhibiting state. As a result, the packet data from the A port is output to the C port through data transmission path TP37. Thereafter, the transmission acknowledging signal AK40 enters the permitting state, so that the packet data from the B port is output to the C port through data transmission path TP37.

When the packet data from the B port arrives prior to the packet data f tom the. A port, the transmission acknowledging signal AK39 is set to the inhibiting state and the transmission acknowledging signal AK40 is set to the permitting state. As a result, the packet data from the B port is output to the C port through data transmission path TP37. Thereafter, the transmission acknowledging signal AK39 enters the permitting state, so that the packet data from the A port is output to the C port through transmission path TP37.

As described in the foregoing, the packet data from the A port and the B port are output to the C port in the order of arrival.

(2) In a case where the packet data from the A port is output to the C port and the packet data from the B port is output to the D port:

The packet data from the A port is output to the C port through data transmission paths TP11, TP12, TP13, TP31, TP32, TP33 and TP37. On the other hand, the packet data from the B port is output to the D port through data transmission paths TP21, TP22, TP24, TP44, TP45, TP46 and TP47.

As described above, the packet: data from the A port and the B port are simultaneously output to the C port and the D port, respectively.

(3) in a case where the packet data from the A port is output to the D port and the packet data from the B port is output to the C port:

The packet data from the A port is output to the D port through data transmission paths TP11, TP12, TP14, TP41, TP42, TP43 and TP47. On the other hand, the packet data from the B port is output to the C port through data transmission paths TP21, TP22, TP23, TP34, TP35, TP36 and TP37.

As described above, the packet data from the A port and the B port are simultaneously transferred to the D port and the C port, respectively.

(4) In a case where the packet data from the A port and the B port are both output to the D port:

The packet data from the A port is transferred to the data transmission path TP43 through data transmission paths TP11, TP12, TP14, TP41 and TP42. The packet data from the B port is transferred to data transmission path TP46 through data transmission paths TP21, TP22, TP24, TP44 and TP45.

When the packet data from the A port arrives prior to the packet data from the B port, the packet data from the A port is output to the D port through data transmission path TP47 and thereafter, the packet data from the B port is output to the D port through data transmission path TP47.

Conversely, when the packet data from the B port arrives prior to the data packet from the A port, the packet data from the B port is output to the D port through data transmission path TP47 and thereafter, the packet data from the A port is output to the D port through data transmission path TP47.

As described in the foregoing, both of the packet data from the A port and the B port are transferred to the D port in the order of arrival.

In the present invention, when branch destinations of the packet data applied from the A port and the B port differ from each other as described above, packet data are simultaneously transferred to the respective ports. In addition, when the branch destinations of the packet data from the A port and the B port are the same, the packet data are transferred in the order of arrival. Therefore, in a case where the packet data have different branch destinations, junction and branching control can be performed without reducing a flow rate of applied packet data. As a result, the efficiency of packet data junction and branching is improved.

Figure 4:
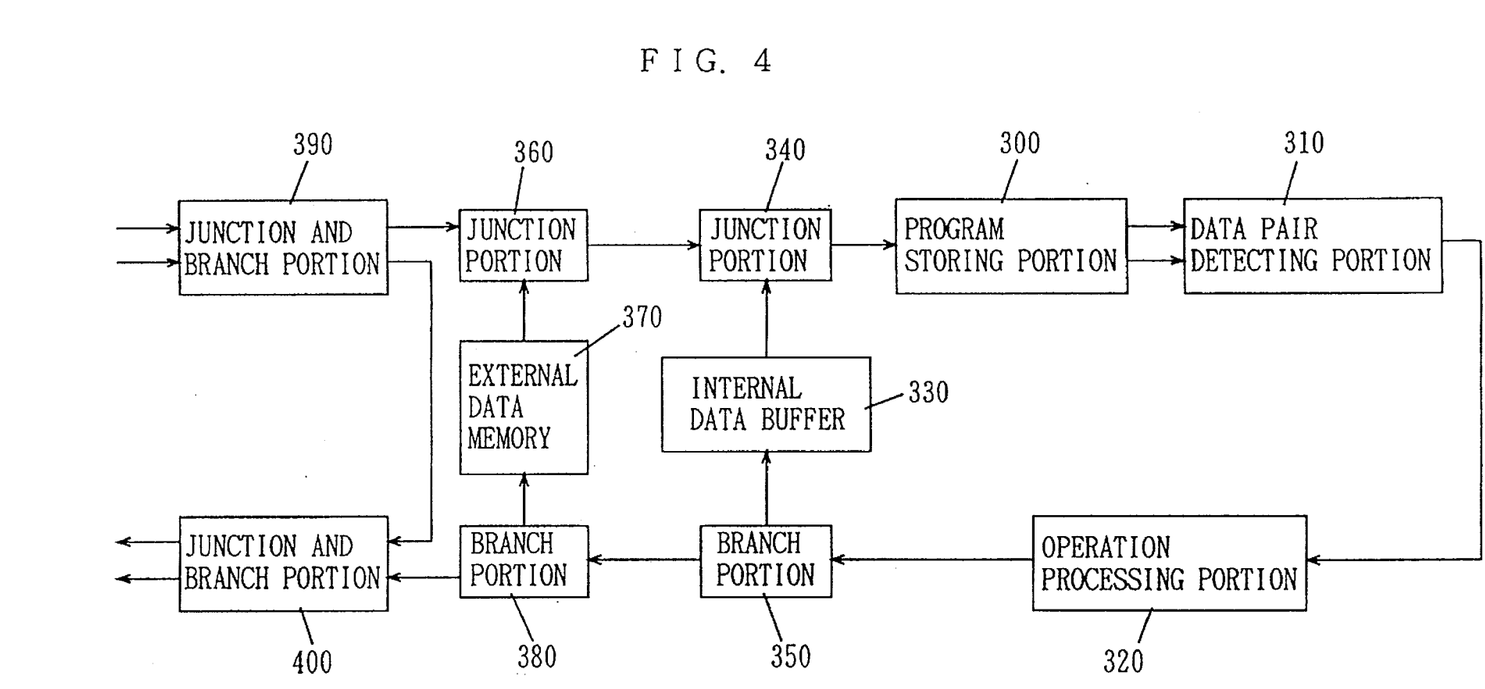
FIG. 4 is a block diagram showing the structure of a data flow type information processor to which the data transmission apparatus of the embodiment is applied.
Figure 5:
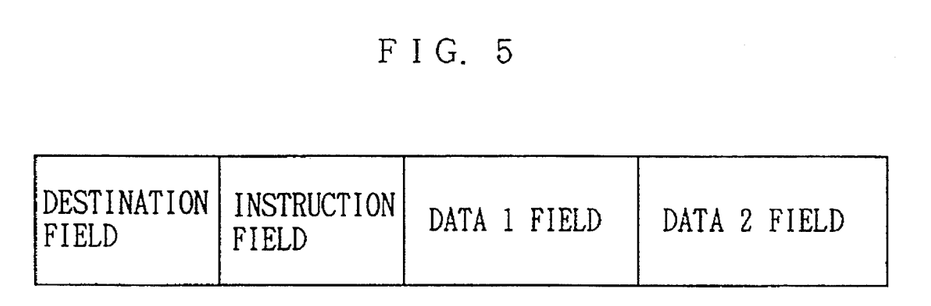
FIG. 5 is a diagram showing a field arrangement of a data packet to be processed in the data flow type information processor.

The data transmission apparatus according to the present invention is applicable to a data flow type information processor, for example FIG. 4 is a block diagram showing one example of the structure of a data flow type information on processor. FIG. 5 is a diagram showing one example of a field arrangement of a data packet to be processed by the information processor.

The data packet shown in FIG. 5 includes a destination field, an instruction field, a data 1 field and a data 2 field. The destination field stores destination information, the instruction field stores instruction information and the data 1 field or the data 2 field stores operand data.

The destination field and the instruction field correspond to the first word D1, and the data 1 field and the data 2 field correspond to the second word D2 shown in FIG. 3. An m-bit identifier is included in destination information.

Figure 6:
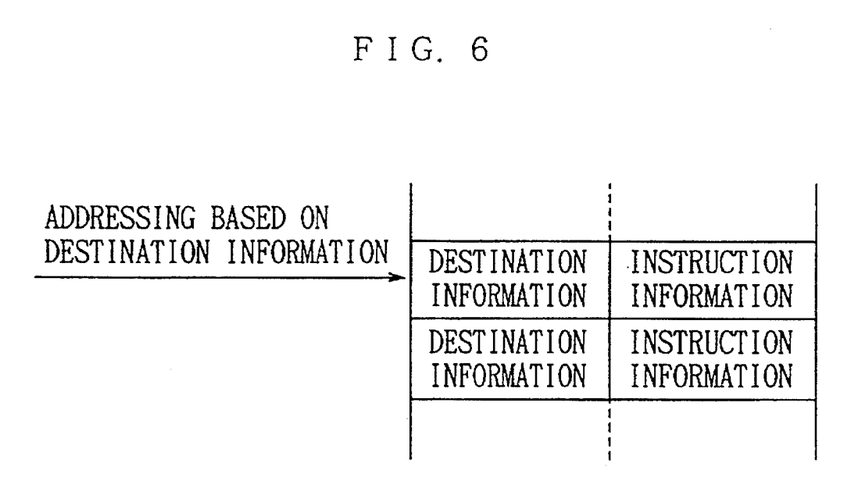
FIG. 6 is a diagram showing a data flow program stored in a program storing

In FIG. 4, a program storing portion 300 stores the data flow program shown in FIG. 6. Each row of the data flow program includes destination information and instruction information. Program storing portion 300 reads destination information and instruction information of the data flow program by addressing based on the destination information of an input data packet as shown in FIG. 6, stores the read destination information and instruction information in the destination field and the instruction field in the data packet and outputs the data packet.

A data pair detecting portion 310 queues data packets output from program storing portion 300. More specifically, when instruction information indicates 2-input instruction, portion 310 detects two different data packets having the some data destination information, stores operand data of one of the data packets (the content., of the data 1 field in FIG. 5) in the data 2 field of the other data packet and outputs the other data packet. When the instruction information indicates 1-input instruction, the input data packet is output without modification.

An operation processing portion 320 carries out an operation processing with respect to data packets output from data pair detecting portion 310 based on the instruction information, stores the result in the data 1 field of the data packet and outputs the data packet to a branch portion 350. Branch portion 350 applies the data packet to a junction portion 340 through an internal data buffer 330 or a branch portion 380. Junction portion 340 outputs the data packet from internal data buffer 330 or the data packet from a junction portion 360 to program storing portion 300 in the order of arrival.

As data packets continue to circulate through program storing portion 300, data pair detecting portion 310, operation processing portion 320, branch portion 350, internal data buffer 330, junction portion 340 and program storing portion 300, an operation processing proceeds based on the data flow program stored in program storing portion 300.

Junction and branch portions 390 and 400 are used for communication between the data flow type information process of and the outside. The data transmission apparatus according to the above-described embodiment can be used as junction and branch portions 390 and 400.

The data transmission apparatus according to the present invention is not only applied to a data flow type information processor but also applied to other apparatuses requiring data transmission.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data packet switching apparatus for transmitting a plurality of data applied from each of a plurality of stage portions preceding said apparatus to any of a plurality of stage portions succeeding said apparatus, the data including an identifier for specifying a succeeding stage to which the data is to be transmitted, the data packet switching apparatus comprising:

a plurality of branching means, each provided corresponding to a respective one of said plurality of stage portions preceding said apparatus; and a plurality of merging means, each provided corresponding to a respective one of said plurality of stage portions succeeding said apparatus, each of said plurality of merging means including, a plurality of second data transmission paths, each provided corresponding to a respective one of said plurality of branching means, and merging controlling means for sequentially applying data of said plurality of second data transmission paths to the preceding stage portions and applying the data to the respective one of said plurality of stage portions succeeding said apparatus;

each of said plurality of branching means for receiving data from a respective one of said plurality of stage portions preceding said apparatus and for transmitting the data to any of said plurality of merging means based on the identifier included in the data, each of said plurality of branching means including, a plurality of first data transmission paths, each provided corresponding to a respective one of said plurality of merging means, and branch controlling means for receiving data from the respective one of said plurality of stage portions preceding said apparatus and applying the data to any of said plurality of first data transmission paths based on the identifier included in the data, wherein said branch controlling means includes activating means for activating a respective one of said plurality of first data transmission paths based on the identifier, each of said plurality of merging means for sequentially transmitting the data applied from said plurality of branching means to a respective one of said plurality of stage portions succeeding said apparatus, wherein said plurality of said branching means are connected to respective ones of said plurality of said merging means through direct connections.

2. The data packet switching apparatus according to claim 1, wherein said activating means comprises:

comparing means for comparing the identifier with a predetermined signal; and activation signal generating means for applying an activation signal to the respective one of said plurality of first data transmission paths based on a comparison result of said comparing means.

3. A data packet switching apparatus for transmitting a plurality of data applied from each of a plurality of stage portions preceding said apparatus to any of a plurality of stage portions succeeding said apparatus, the data including an identifier for specifying a succeeding stage to which the data is to be transmitted, the data packet switching apparatus comprising:

a plurality of branching means, each provided corresponding to a respective one of said plurality of stage portions preceding said apparatus; and a plurality of merging means, each provided corresponding to a respective one of said plurality of stage portions succeeding said apparatus, each of said plurality of merging means includes, a plurality of second data transmission paths, each provided corresponding to a respective one of said plurality of branching means, and merging controlling means for sequentially applying data of said plurality of second data transmission paths to the preceding stage portions and applying the data to the respective one of said plurality of stage portions succeeding said apparatus, wherein said merging controlling means controls the respective plurality of second data transmission paths such that data is transferred from one of the respective plurality of second data transmission paths to the respective one of the plurality of stage portions succeeding said apparatus in the order of arrival;

each of said plurality of branching means for receiving data from a respective one of said plurality of stage portions preceding said apparatus and for transmitting the data to any of said plurality of merging means based on the identifier included in the data, each of said plurality of branching means including, a plurality of first data transmission paths, each provided corresponding to a respective one of said plurality of merging means, and branch controlling means for receiving data from the respective one of said plurality of stage portions preceding said apparatus and applying the data to any of said plurality of first data transmission paths based on the identifier included in the data, each of said plurality of merging means for sequentially transmitting the data applied from said plurality of branching means to a respective one of said plurality of stage portions succeeding said apparatus, wherein said plurality of said branching means are connected to respective ones of said plurality of said merging means through direct connections.

4. A data packet switching apparatus for transmitting a plurality of data applied from each of a plurality of stage portions preceding said apparatus to any of a plurality of stage portions succeeding said apparatus, the data including an identifier for specifying a succeeding stage to which the data is to be transmitted, the data packet switching apparatus comprising:

- a plurality of branching means, each provided corresponding to a respective one of said plurality of stage portions preceding said apparatus; and
- a plurality of merging means, each provided corresponding to a respective one of said plurality of stage portions succeeding said apparatus, each of said plurality of merging means including,
  - a plurality of second data transmission paths, each provided corresponding to a respective one of said plurality of branching means, and
  - merging controlling means for sequentially applying data of said plurality of second data transmission paths to the preceding stage portions and applying the data to the respective one of said plurality of stage portions succeeding said apparatus;
- each of said plurality of branching means for receiving data from a respective one of said plurality of stage portions preceding said apparatus and for transmitting the data to any of said plurality of merging means based on the identifier included in the data, each of said plurality of branching means including,
  - a plurality of first data transmission paths, each provided corresponding to a respective one of said plurality of merging means, and
  - branch controlling means for receiving data from the respective one of said plurality of stage portions preceding said apparatus and applying the data to any of said plurality of first data transmission paths based on the identifier included in the data,
- each of said plurality of merging means for sequentially transmitting the data applied from said plurality of branching means to a respective one of said plurality of stage portions succeeding said apparatus, and
- wherein said plurality of said branching means are connected to respective ones of said plurality of said merging means through direct connections, wherein
  - each of said plurality of stage portions preceding said apparatus includes a data transmission path for performing synchronous handshake type data transmission,
  - each of said plurality of stage portions succeeding said apparatus includes a data transmission path for performing synchronous handshake type data transmission,
  - each of said plurality of first data transmission paths performs synchronous handshake type data transmission, and
  - each of said plurality of second data transmission paths performs synchronous handshake type data transmission.

* * * * *